(12) United States Patent
Satou et al.

(10) Patent No.: US 9,714,869 B2
(45) Date of Patent: Jul. 25, 2017

(54) TEMPERATURE SENSOR INCLUDING THERMOSENSITIVE ELEMENT

(75) Inventors: Motoki Satou, Okazaki (JP); Tsunenobu Hori, Kariya (JP); Kaoru Kuzuoka, Toyota (JP); Chiaki Ogawa, Tajimi (JP); Kazuhiro Inoguchi, Toyota (JP)

(73) Assignee: DENSO CORPORATION, Kariya (JP)

( * ) Notice: Subject to any disclaimer, the term of this patent is extended or adjusted under 35 U.S.C. 154(b) by 980 days.

(21) Appl. No.: 13/695,078

(22) PCT Filed: Apr. 26, 2011

(86) PCT No.: PCT/JP2011/060099
§ 371 (c)(1),
(2), (4) Date: May 16, 2013

(87) PCT Pub. No.: WO2011/136193
PCT Pub. Date: Nov. 3, 2011

(65) Prior Publication Data
US 2013/0223479 A1  Aug. 29, 2013

(30) Foreign Application Priority Data

Apr. 28, 2010 (JP) .................. 2010-104412
Mar. 28, 2011 (JP) .................. 2011-070783

(51) Int. Cl.
*G01K 7/00* (2006.01)
*G01K 1/00* (2006.01)
(Continued)

(52) U.S. Cl.
CPC .............. *G01K 7/02* (2013.01); *G01K 1/12* (2013.01); *G01K 7/22* (2013.01); *H01C 1/148* (2013.01); *H01C 7/008* (2013.01)

(58) Field of Classification Search
USPC ...................................... 374/185, 183, 208
See application file for complete search history.

(56) References Cited

U.S. PATENT DOCUMENTS 5,210,517 A * 5/1993 Abe ................. H01C 1/028
338/22 R
5,358,793 A * 10/1994 Hanada ............ H01C 1/1406
252/512

(Continued)

FOREIGN PATENT DOCUMENTS

JP 62-189701 8/1987
JP 8-162302 6/1996
(Continued)

OTHER PUBLICATIONS

Translation of JP 8162302 A (Jun. 21, 1996).*
(Continued)

*Primary Examiner* — Mirellys Jagan
(74) *Attorney, Agent, or Firm* — Nixon & Vanderhye P.C.

(57) ABSTRACT

A temperature sensor 1 includes: a thermosensitive element 2 composed of a low-thermal expansion ceramics having a coefficient of linear expansion of $3 \times 10^{-6}/°$ C. to $5 \times 10^{-6}/°$ C. and of which electrical characteristics change depending on temperature; a pair of electrode films 20 provided on the surfaces of the thermosensitive element 2; and a pair of lead wires having a coefficient of linear expansion of $15 \times 10^{-6}/°$ C. or less and bonded to the electrode films 20. When the coefficients of linear expansion of the thermosensitive element 2, the electrode film 20, and the lead wire 21 are respectively $T_a(/°$ C.$)$, $T_b(/°$ C.$)$, and $T_d(/°$ C.$)$, the temperature sensor 1 satisfies a relationship $T_a \leq T_b \leq T_d$.

17 Claims, 6 Drawing Sheets

(51) Int. Cl.
*G01K 7/02* (2006.01)
*G01K 1/12* (2006.01)
*G01K 7/22* (2006.01)
*H01C 1/148* (2006.01)
*H01C 7/00* (2006.01)

(56) References Cited

U.S. PATENT DOCUMENTS

| | | | |
|---|---|---|---|
| 6,245,439 B1 | 6/2001 | Yamada et al. | |
| 7,748,898 B2* | 7/2010 | Toudou et al. | 374/208 |
| 8,269,598 B2* | 9/2012 | Kobayashi | G01K 7/22 |
| | | | 338/22 R |
| 2012/0049996 A1* | 3/2012 | Kobayashi et al. | 338/22 R |
| 2012/0063488 A1* | 3/2012 | Nakayama et al. | 374/185 |
| 2012/0082181 A1* | 4/2012 | Alnaqash et al. | 374/144 |
| 2013/0020670 A1* | 1/2013 | Hori et al. | 257/467 |
| 2013/0235904 A1* | 9/2013 | Toudou et al. | 374/185 |
| 2016/0033337 A1* | 2/2016 | Sato | G01K 7/22 |
| | | | 374/185 |

FOREIGN PATENT DOCUMENTS

| | | | | |
|---|---|---|---|---|
| JP | 8-273904 | 10/1996 | | |
| JP | 2009-115789 | 5/2009 | | |
| JP | 2012049330 A | * | 3/2012 | G01K 7/22 |

OTHER PUBLICATIONS

Thermal Expansion Coefficients (no date).*
International Preliminary Report on Patentability dated Dec. 20, 2012, issued in counterpart Japanese Application No. PCT/JP2011/060099 with English translation.
Office Action (3 pages) dated Feb. 5, 2013, issued in corresponding Japanese Application No. 2011-070783 and English translation (3 pages).
International Search Report for PCT/JP2011/060099 mailed May 31, 2011, with translation.
Written Opinion of the International Searching Authority mailed May 31, 2011.

* cited by examiner

TEMPERATURE SENSOR INCLUDING THERMOSENSITIVE ELEMENT

This application is the U.S. national phase of International Application No. PCT/JP2011/060099 filed 26 Apr. 2011 which designated the U.S. and claims priority to JP 2010-104412 filed 28 Apr. 2010 and JP 2011-070783 filed 28 Mar. 2011, the entire contents of each of which are hereby incorporated by reference.

TECHNICAL FIELD

The present invention relates to a temperature sensor including a thermosensitive element composed of low-thermal expansion ceramics having a low coefficient of linear expansion and of which electrical characteristics change depending on temperature.

BACKGROUND ART

A temperature sensor using a thermosensitive element (thermistor element) of which a resistance value changes depending on temperature is known as a temperature sensor that measures the temperature of exhaust gas of an automobile and the like.

The temperature sensor includes a thermosensitive element, an electrode wire, a sheath pin, and a protective layer. The thermosensitive element is composed of an oxide, such as $Y_2O_3.Ycr/MnO_3$. An electrode film composed of Pt or the like is provided on the surface of the thermosensitive element. The electrode wire composed of Pt or the like is connected to the electrode film. The sheath pin includes therein a signal wire electrically connected to the electrode wire. The protective layer has a two-layer structure composed of a glass mold covering the thermistor element (refer to JP-A-2009-115789).

The temperature sensor configured in this manner has the thermosensitive element composed of an oxide, as described above. Therefore, in a temperature sensor that is used under reductive conditions, such as for measurement of the exhaust gas temperature of an automobile, the two-layer structure protective layer is formed as described above from the perspective of preventing reduction degradation of the thermosensitive element and reducing internal stress.

However, when the protective layer is formed having a two-layer structure, the configuration of the temperature sensor becomes complicated and manufacturing cost increases.

In addition, in the temperature sensor having the above-described conventional configuration, the electrode film composed of platinum Pt is formed on the thermosensitive element. Therefore, the signal wire within the sheath pin and the electrode film are connected by an interconnecting electrode wire composed of Pt. However, because platinum Pt is used, manufacturing cost increases.

In addition, for use in temperature measurement of exhaust gas and the like, the temperature sensor may be set near an internal combustion engine. In this instance, large vibrations from the internal combustion engine are easily transmitted to the temperature sensor. As a result, the thermosensitive element of the temperature sensor may vibrate, and the bonding section between the thermosensitive element and the electrode wire may become disconnected. In particular, disconnection easily occurs in the electrode wire composed of platinum Pt.

In light of the above-described circumstances, a thermosensitive element using a wide-range thermistor material has been receiving attention in recent years (refer to JP-A-H08-273904). The thermosensitive element is configured by a first phase and a second phase. The first phase is composed of insulating matrix particles composed of a non-oxide. The second phase is composed of semiconductive or conductive particles dispersed discontinuously in the shape of a three-dimensional mesh in the first phase. The wide-range thermistor material such as this is composed of a non-oxide. Therefore, the thermistor material is not easily reduced even in a reducing atmosphere. A two-layer structure protective layer such as that described above is not required. Cost reduction of the temperature sensor can be achieved.

CITATION LIST

Patent Literature

[PTL 1] JP-A-2009-115789
[PTL 2] JP-A-H08-273904

SUMMARY OF INVENTION

Technical Problem

However, even when the wide-range thermistor material is used, the problem of disconnection in the electrode wire composed of platinum Pt cannot be solved. In addition, manufacturing cost increases when an expensive noble metal such as Pt is used. Therefore, development of a temperature sensor that does not use an electrode wire composed of Pt is desired.

The thermosensitive element composed of the wide-range thermistor material generally has a low coefficient of linear expansion. A bonding structure for the thermosensitive element having a low coefficient of linear expansion such as this and the electrode film, and the electrode film and a lead wire is still unknown. An inappropriate combination may cause disconnection as a result of vibrations and damage to the thermosensitive element as a result of thermal stress in a wide-range environment.

The present invention has been achieved in light of the above-described issues. An object of the present invention is to provide a temperature sensor including a thermosensitive element having low thermal expansion, in which disconnection can be prevented, reliability in a wide-range environment is excellent, and manufacturing can be performed at low cost.

Solution to Problem

According to a basic aspect of a temperature sensor of the present invention, the temperature sensor includes a thermosensitive element, a pair of electrode films, and a pair of lead wires. The thermosensitive element is composed of a low-thermal expansion ceramics having a coefficient of linear expansion of $3\times10^{-6}/°C.$ to $5\times10^{-6}/°C.$ and of which electrical characteristics change depending on temperature. The pair of electrode films are provided on the surfaces of the thermosensitive element. The pair of lead wires have a coefficient of linear expansion of $15\times10^{-6}$ or less and are bonded to the electrode films. When the coefficients of linear expansion of the thermosensitive element, the electrode film, and the lead wire are respectively $T_a$, $T_b$, and $T_d$, the coefficients of linear expansion are set to satisfy a relationship $T_a \leq T_b \leq T_d$.

Advantageous Effects of Invention

Therefore, the temperature sensor of the present invention include the thermosensitive element composed of the low-thermal expansion ceramics. When the coefficients of linear expansion of the thermosensitive element, the electrode film, and the lead wire are respectively $T_a$, $T_b$, and $T_d$, the relationship $T_a \leq T_b \leq T_d$ is satisfied. In other words, the thermosensitive element, the electrode films, and the lead wires are selectively used such that the relationship $T_a \leq T_b \leq T_d$ is satisfied. Therefore, the coefficients of linear expansion of the thermosensitive element, the electrode film, and the lead wire can be made closer to one another while being changed in steps.

In other words, a gradual gradient of the coefficient of linear expansion is formed between the thermosensitive element composed of the low-thermal expansion ceramics and the lead wires, via the electrode films. Therefore, thermal stress can be reduced even in a wide-range environment. Disconnection and the like do not easily occur. The temperature sensor can exhibit excellent reliability.

In addition, in the temperature sensor of the present invention, a lead wire having a coefficient of linear expansion of $15 \times 10^{6/°}$ C. or less is used as the lead wires bonded to the electrode films. Therefore, in the temperature sensor, the differences in coefficient of linear expansion among the thermosensitive element, the electrode films, and the lead wires can be further reduced. As a result, disconnection and the like are further unlikely to occur.

In addition, in the temperature sensor, the thermosensitive element, the electrode films, and the lead wires can be selectively used to satisfy the relationship $T_a \leq T_b \leq T_d$. A metal electrode other than expensive noble metals, such as Pt, can be used as the electrode films and the lead wires. Therefore, departure from use of noble metals can be achieved. The temperature sensor can be manufactured at a low cost.

In this way, in the present invention, in the temperature sensor including the thermosensitive element having low thermal expansion, disconnection can be prevented. In addition, a temperature sensor having excellent reliability in a wide-range environment and capable of being manufactured at a low cost can be provided.

The above-described basic aspect can be modified to various favorable aspects.

As described above, the temperature sensor of the present invention includes the thermosensitive element, the electrode films, and the lead wires. When the coefficients of linear expansion of the thermosensitive element, the electrode film, and the lead wire are respectively $T_a(/° C.)$, $T_b(/° C.)$, and $T_d(/° C.)$, the relationship $T_a \leq T_b \leq T_d$ is satisfied. On the other hand, when the relationship $T_a \leq T_b \leq T_d$ is not satisfied, sufficient reduction of thermal stress may become difficult in a wide-range environment, such as that of −50° C. to 1050° C.

When the electrode films and the lead wires are bonded by a bonding material composed of metal and the coefficient of linear expansion of the bonding material is $T_c(/° C.)$, a relationship $T_a \leq T_b \leq T_c \leq T_d$ is preferably satisfied.

In this instance, the coefficients of linear expansion can form a more gradual gradient as a result of the bonding material being included between the electrode films and the lead wires. Therefore, in the temperature sensor, thermal stress is further reduced in a wide-range environment. Reliability of the temperature sensor can be further improved.

The temperature sensor includes a sheath pin including lead wires therein. A structure can be formed in which the lead wires exposed from the tip end side of the sheath pin are connected to the electrode films.

In this instance, the operational effect of preventing disconnection of the present invention becomes more notable. In other words, in the temperature sensor configured such that the lead wires extending from the sheath pin are directly connected to the electrode films, when electrode wires composed of Pt are used, disconnection easily occurs. As a result of the configuration of the present invention being used, use of electrode wires composed of Pt can be avoided. Disconnection can be sufficiently prevented even when the configuration in which the lead wires extending from the sheath pin are directly connected to the electrode films is used.

In addition, the temperature sensor includes a sheath pin including signal wires therein. A structure can also be formed in which the signal wires exposed from the tip end side of the sheath pin are connected to the lead wires connected to the electrode films.

The thermosensitive element is composed of a low-thermal expansion ceramics having a coefficient of linear expansion of $3 \times 10^{-6}/°$ C. to $5 \times 10^{-6}/°$ C. A low-thermal expansion ceramics having a coefficient of linear expansion of $4 \times 10^{-6}/°$ C. to $5 \times 10^{-6}/°$ C. is preferable.

Specifically, the thermosensitive element can be configured by a low-thermal expansion ceramics having, for example, a matrix phase composed of insulating matrix particles composed of a non-oxide.

The thermosensitive element preferably has a matrix phase composed of matrix particles composed of silicone nitride. In this instance, a temperature sensor having favorable sensitivity can be actualized.

More preferably, a low-thermal expansion ceramics is used that is configured by a matrix phase (first phase) composed of matrix particles composed of silicon nitride, and semiconductive or conductive second phase particles discontinuously dispersed in a three-dimensional mesh shape in the first phase.

In this instance, a temperature sensor having favorable sensitivity can be actualized. In addition, a temperature sensor having excellent heat resistance and capable of preventing reduction degradation can be actualized.

As a low-thermal expansion ceramics configured by the first phase and the second phase particles, specifically, a wide-range thermistor material or a composite material described in, for example, JP-A-2000-348907, JP-A-H08-273904, JP-A-H07-331358, and JP-A-H06-227870 can be used.

More specifically, as the matrix particles, for example, particles composed of a silicon nitride or oxynitride ceramics can be used. Particles composed of a silicon nitride ceramics are preferable.

In addition, as the second phase particles, particles composed of silicon carbide or the like can be used.

Specifically, for example, a low-thermal expansion ceramics manufactured as follows can be used. In other words, 30 vol % to 50 vol % silicon carbide (SiC) powder (mean particle size of 0.2 μm or less), 4 vol % to 7 vol % yttrium oxide ($Y_2O_3$) powder (mean particle size of 0.5 μm or less) as a sintering aid, 0.6 vol % to 4 vol % titanium boride powder ($TiB_2$) (mean particle size of 0.4 μm or less) as an additive, and remaining parts (vol %) silicon nitride ($Si_3N_4$) powder (mean particle size of 0.7 μm or less) are mixed. The mixture is mixed in a dispersion medium, such as water or alcohol. Then, the mixed raw material is molded and heated, thereby obtaining the low-thermal expansion ceramics.

Next, the electrode films, the lead wires, and the bonding material are preferably composed of an alloy containing at least Cr and Fe. In the alloy containing Cr and Fe, the alloy becomes a material having a lower coefficient of linear expansion as the Cr content increases. The coefficient of linear expansion can become closer to that of the thermosensitive element. In addition, compared to noble metals, such as Pt, an alloy containing Cr has high strength and disconnection does not easily occur. Furthermore, by Fe being added, ductility of the material can be improved. The coefficient of linear expansion can be adjusted.

The electrode films can be composed of a Cr—Fe alloy. Specifically, the electrode films are preferably composed of an alloy of which the main component is Cr or Fe. The electrode films are more preferably composed of a Cr—Fe alloy of which the main component is Cr.

The coefficient of linear expansion $T_b$ (1° C.) of the electrode film is preferably $T_b \leq 11 \times 10^{-6}$.

In this instance, the differences in linear expansion among the thermosensitive element, the lead wires, and the electrode films can be further reduced. In addition, when the bonding material is included, the differences in linear expansion among the thermosensitive element, the bonding material, the lead wires, and the electrode films can be further reduced. Therefore, in this instance, thermal stress can be further reduced even in a wide-range usage environment. Reliability can be further improved.

In addition, the coefficient of linear expansion of the electrode film at temperatures of 0° C. to 100° C. can be, for example, $4 \times 10^{-6}/°$ C. to $9 \times 10^{-6}/°$ C. In this instance, the differences in thermal expansion among the thermosensitive element, the lead wires, and the electrode films or the differences in thermal expansion among the thermosensitive element, the bonding material, the lead wires, and the electrode films can be further reduced. Therefore, durability of the temperature sensor in a high-temperature environment can be further improved. In addition, thermal stress can be even further reduced even in a wide-range usage environment. Reliability can be further improved.

The coefficient of linear expansion $T_d$(/° C.) of the lead wire is preferably $15 \times 10^{-6}/°$ C. or less, or in other words, $T_d \leq 15 \times 10^{-6}$. More preferably, $T_d \leq 14 \times 10^{-6}$.

The coefficient of linear expansion of the lead wire can be, for example $4 \times 10^{-6}/°$ C. to $14 \times 10^{-6}/°$ C.

In this instance, the differences in thermal expansion among the thermosensitive element, the electrode films, and the lead wires or the differences in thermal expansion among the thermosensitive element, the electrode films, the bonding material, and the lead wires can be further reduced. Therefore, durability of the temperature sensor in a high-temperature environment can be further improved. In addition, thermal stress can be further reduced even in a wide-range usage environment. Reliability can be further improved.

In addition, the lead wires can be composed of a Ni-based alloy or a ferrite-type stainless steel. As described above, these materials preferably contain Cr and Fe.

As the Ni-based alloy, for example, NCF601 (JIS G4901) can be used. Specifically, NCF601 (JIS G4901) has a composition containing 0.10 wt % or less C, 0.50 wt % or less Si, 1.0 wt % or less Mn, 0.030 wt % or less P, 0.015 wt % or less S, 58.00 wt % to 63.00 wt % Ni, 21.00 wt % to 25.00 wt % Cr, 1.00 wt % Cu, 1.00% to 1.70 wt % Al, and remaining parts Fe.

In addition, as the ferrite-type stainless steel, for example, SUH21 (JIS G4312) composed of a Fe—Cr—Al alloy can be used. Specifically, SUH21 (JIS G4312) has a composition containing 17 wt % to 21 wt % Cr, 2.0 wt % to 4.0 wt % Al, 0.10 wt % or less C, 1.50 wt % less Si, 1.0 wt % or less Mn, 0.040 wt % or less P, 0.030 wt % or less S, and remaining parts Fe.

In addition, as described above, the bonding material is preferably composed of an alloy containing Cr and Fe. The bonding material is formed by paste-state metal powder being baked.

The bonding material $T_c$(/° C.) is preferably $T_c \leq 12 \times 10^{-6}$.

In this instance, the differences in linear expansion among the thermosensitive element, the electrode films, the bonding material, and the lead wires can be further reduced. Therefore, thermal stress can be reduced even in a wide-range environment. Reliability of the temperature sensor can be improved.

Specifically, the bonding material is preferably formed by a paste-state Fe—Cr—Al alloy or Cr—Fe alloy being baked.

When lead wires composed of a Ni-based alloy are used, the coefficient of linear expansion of the bonding material is more preferably $9 \times 10^{-6}/°$ C. to $12 \times 10^{-6}/°$ C. The bonding material is preferably formed by a paste-state Fe—Cr—Al alloy being baked. In this instance, a passive film of Al is formed. Therefore, oxidation resistance at high temperatures is excellent.

As the Fe—Cr—Al alloy, for example, an alloy containing 17 wt % to 21 wt % Cr and 2 wt % to 6 wt % Al can be used. Specifically, for example, SUH21 (JIS G4312) can be used. As components other than Fe, the alloy has a composition containing 17 wt % to 21 wt % Cr, 2.0 wt % to 4.0 wt % Al, 0.10 wt % or less C, 1.50 wt % or less Si, 1.0 wt % or less Mn, 0.040 wt % or less P, and 0.030 wt % S.

In addition, when lead wires composed of a ferrite-type stainless steel are used, the coefficient of linear expansion of the bonding material is more preferably $9 \times 10^{-6}/°$ C. to $11 \times 10^{-6}/°$ C. The bonding material is preferably formed by a paste-state Cr—Fe alloy being baked.

In the Cr—Fe alloy, the coefficient of linear expansion decreases as the ratio of Cr increases. Therefore, thermal stress can be further reduced.

As the Cr—Fe alloy, an alloy containing 60 wt % to 90 wt % Cr and 40 wt % to 10 wt % Fe is preferable. Specifically, as the Cr—Fe alloy, for example, Cr40Fe alloy can be used.

The baking temperature for the bonding material is preferably 1000° C. to 1490° C., and more preferably 1000° C. to 1200° C.

When the baking temperature is lower than 1000° C., bonding strength may be insufficient. Alternatively, sintering of the metal powder may be insufficient. On the other hand, when the baking temperature exceeds 1490° C., the alloy may melt, making bonding between the lead wires and the electrode films difficult. The baking temperature is more preferably 1200° C. or less.

Next, the electrode films are formed on the overall surfaces of a pair of opposing surfaces of the thermosensitive element. On the bonding surface of the thermosensitive element and the bonding material, the shortest distance between an end portion of the thermosensitive element and the bonding material is preferably at least 0.1 mm or more. In this instance, occurrence of cracks in the thermosensitive element during manufacturing can be prevented.

A reason thereof will be explained. In other words, the electrode films are formed on the overall surfaces of a pair of surfaces of the thermosensitive element. The electrode films are formed by being heat-treated. Therefore, tensile stress is applied to the end portion of the thermosensitive element. When the bonding material is present up to the end portion of the thermosensitive element in which the electrode films are formed, because the bonding material is also formed by being heat-treated, further tensile stress is applied to the thermosensitive element. As a result, cracks may occur in the thermosensitive element.

As described above, on the bonding surface of the thermosensitive element and the bonding material, when the end portion of the thermosensitive element and the bonding material are separated such that the shortest distance is at least 0.1 mm or more, thermal stress on the thermosensitive element from the bonding material no longer affects the end portion of the thermosensitive element. The occurrence of cracks can be prevented.

In addition, a protective layer that seals the thermosensitive element and the electrode films, together with a portion of the lead wires, is preferably included.

In this instance, thermal stress in the bonding sections of the thermosensitive element, the electrode films, and the lead wires can be reduced. In addition, the holding force of the bonding sections can be improved. Durability against vibrations can be further improved. In addition, in the temperature sensor, when the electrode films and the lead wires are bonded by the bonding material, the protective layer reduces thermal stress in the bonding sections of the thermosensitive element, the electrode films, the lead wires, and the bonding material. In addition, the holding force of the bonding sections can be improved. Durability against vibrations can be further improved. The protective layer can be formed, for example, by glass.

DESCRIPTION OF EMBODIMENTS

First Embodiment

Figure 1:
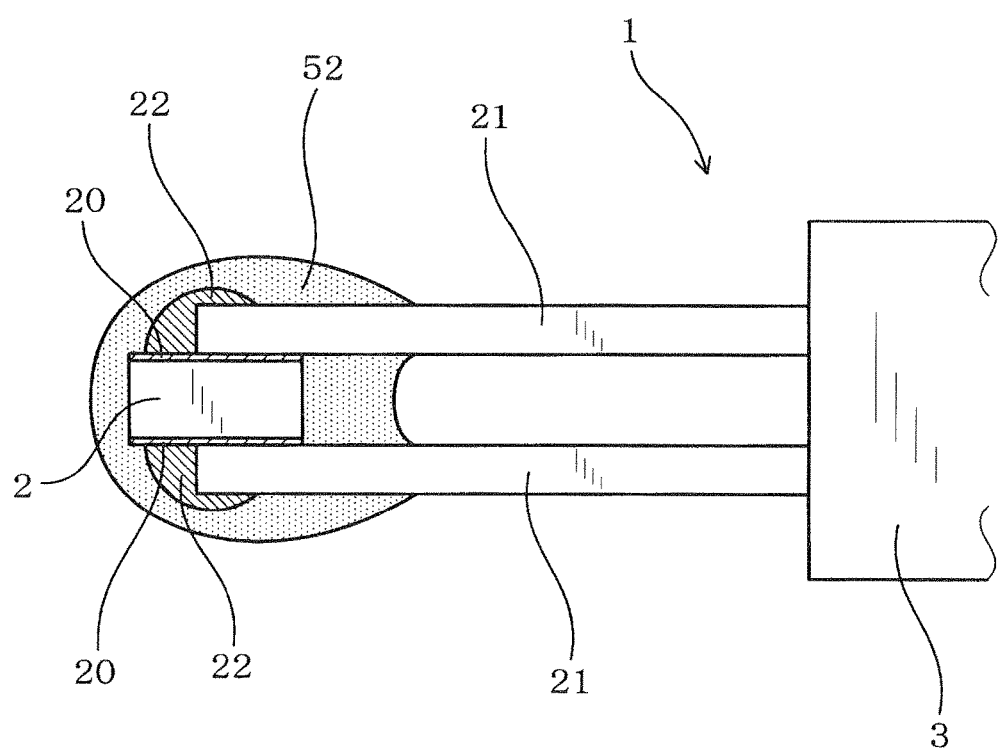
FIG. 1 is a cross-sectional view of the periphery of a thermosensitive element of a temperature sensor according to a first embodiment.
Figure 2:
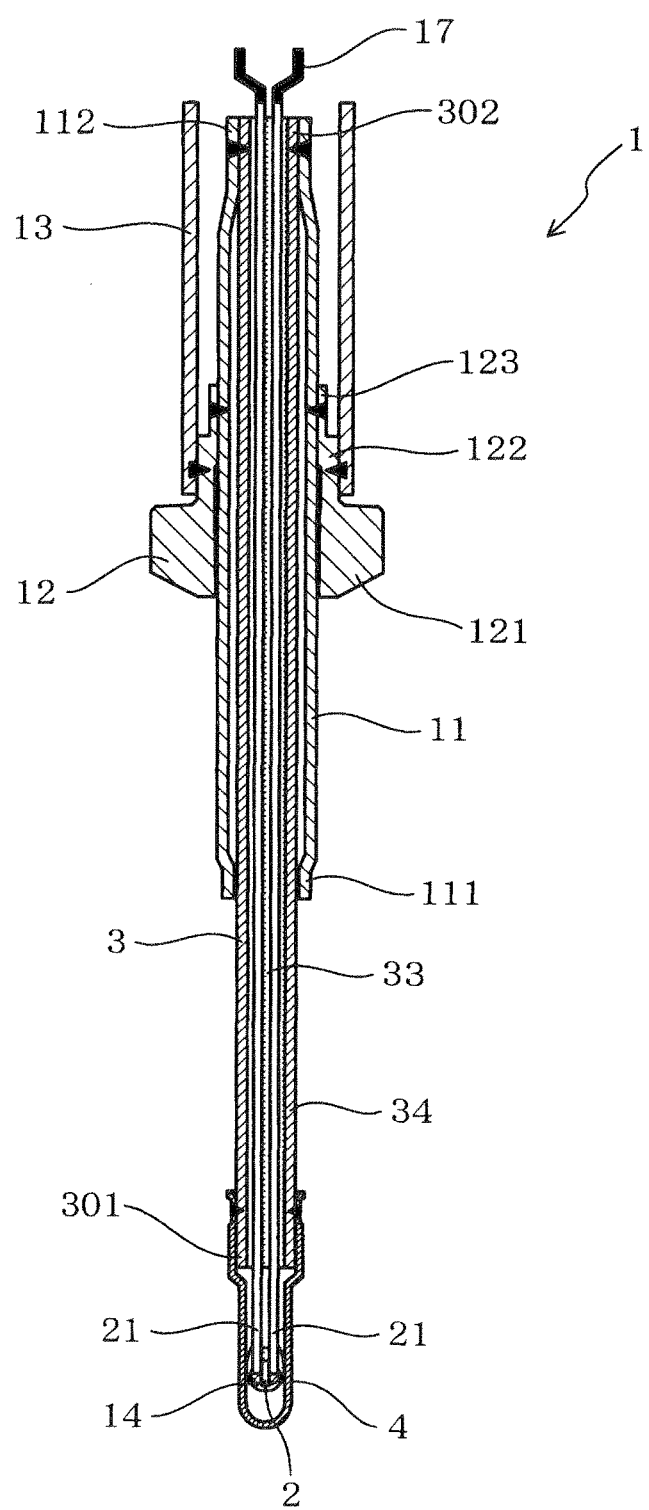
FIG. 2 is a cross-sectional view of the temperature sensor according to the first embodiment.
Figure 3:
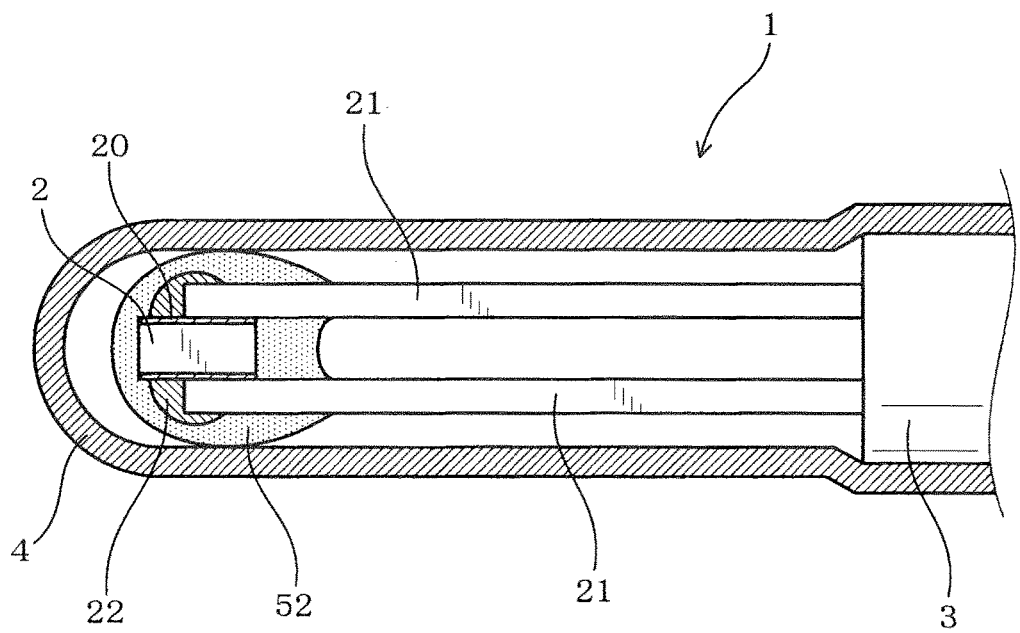
FIG. 3 is a cross-sectional view of a tip portion of the temperature sensor.

Next, a temperature sensor according to a first embodiment of the present invention will be described. A temperature sensor 1 according to the present embodiment includes a thermosensitive element 2, a pair of electrode films 20, and a pair of lead wires 21, as shown in FIG. 1 to FIG. 3. The thermosensitive element 2 is composed of a low-thermal expansion ceramics and electrical characteristics thereof change depending on temperature. The pair of electrode films 20 are provided on the surfaces of the thermosensitive element 2. The pair of lead wires 21 are bonded to the pair of electrode films 20 and used for external circuit connection. The lead wires 21 are bonded to the electrode films 20 by a bonding material 22.

According to the present embodiment, the low-thermal expansion ceramics of the thermosensitive element 2 is configured by a first phase and second-phase particles. The first phase is composed of insulating matrix particles composed of a non-oxide. The second-phase particles are semiconductive or conductive and are discontinuously dispersed in the shape of a three-dimensional mesh in the first phase. According to the present embodiment, the matrix particles are composed of $Si_3N_4$. The second-phase particles are composed of SiC particles. Between the matrix particles, a glass phase composed of $Y_2O_3$ is present. The second-phase particles are dispersed in the glass phase. The coefficient of linear expansion of the thermosensitive element 2 composed of a low-thermal expansion ceramics according to the present embodiment is $4.5 \times 10^{-6}/°$ C.

In addition, the electrode film 20 is composed of Cr-40Fe alloy that is a Cr—Fe alloy. The coefficient of linear expansion of the electrode film 20 is $9 \times 10^{-6}/°$ C. (temperature of 0° C. to 100° C.).

The lead wire 21 is composed of "INCONEL (registered trademark) 601" that is a Ni-based alloy (NCF601) manufactured by Daido-Special Metals Ltd. The coefficient of linear expansion of the lead wire 21 is $14 \times 10^{-6}/°$ C.

In addition, the bonding material is formed by a paste-state Fe—Cr—Al alloy being baked. According to the present embodiment, NAS4425A-type steel (manufactured by Nippon Yakin Kogyo Co., Ltd.) is used as the Fe—Cr—Al alloy. Elemental composition other than Fe is 19 wt % to 21 wt % Cr, 5.0 wt % to 6.0 wt % Al, 0.06 wt % to 0.12 wt % La, 0.015 wt % or less C, 1.0 wt % or less Si, and 1.0 wt % or less Mn. The coefficient of linear expansion of the bonding material is $11 \times 10^{-6}/°$ C.

In addition, the temperature sensor 1 has a protective layer 52. The protective layer 52 seals the thermosensitive element 2, the electrode films 20, and the bonding material 22 together with a portion of the lead wires 21.

The protective layer 52 is composed of a material having an effect of protecting the thermosensitive element 2 at a high temperature of 1000° C. or more. As the material, an inorganic material, amorphous glass, crystallized glass, and the like are given. These materials may be used singly should the material by itself have a desired range of coefficient of linear expansion. However, the protective layer 52 may be configured using a material in which amorphous glass and crystallized glass are combined, an inorganic material power is added to glass, and the like to obtain the desired coefficient of linear expansion. As the inorganic material powder that is added to glass, aluminum oxide ($Al_2O_3$), magnesium oxide (MgO), yttrium oxide ($Y_2O_3$), chromium oxide ($Cr_2O_3$), zirconium oxide ($ZrO_2$), the low-thermal expansion ceramics configuring the thermosensitive element 2, and the like may be given. As the material configuring the protective layer 52, a material of which the coefficient of linear expansion is adjusted by 40 wt % or more low-thermal expansion ceramics configuring the thermosensitive element 2 being added to crystallized glass that is stable at high temperatures is more preferable.

The composition of crystallized glass is preferably composed of, for example, silicon oxide, calcium oxide, manganese oxide, and aluminum oxide. In addition, the crystallized glass more preferably has a composition including 30 wt % to 60 wt % $SiO_2$, 10 wt % to 30 wt % CaO, 5 wt % to 25 wt % MgO, and 0 wt % to 15 wt % $Al_2O_3$.

The temperature sensor 1 according to the present embodiment is a sensor used to measure exhaust gas temperature of an automobile.

In the temperature sensor 1, a guide tube 11 is provided further towards a rear end side than a cover 4, such as to cover an outer periphery of a sheath pin 3, as shown in FIG. 2. A rear end portion 112 of the guide tube 11 is fixed to a rear end portion 302 of the sheath pin 3. The rear end portion 112 of the guide tube 11 and the rear end portion 302 of the sheath pin 3 are welded over the overall circumference. A tip end portion 111 of the guide tube 11 is not fixed to the sheath pin 3. However, the tip end portion 111 is formed such as to interfere with the side surface of the sheath pin 3 with little clearance provided therebetween.

In addition, the guide tube 11 is formed such that the tip end portion 111 and the rear end portion 112 have a smaller diameter than the portion therebetween. In the portion other than the tip end portion 111 and the rear end portion 112, a clearance is formed between the guide tube 11 and the sheath pin 3.

In addition, a rib 12 is disposed in the outer periphery of the guide tube 11. The rib 12 holds the sheath pin 3 with the guide tube 11 therebetween.

The rib 12 is composed of a contacting section 121, a first extending section 122, and a second extending section 123. The contacting section 121 is placed in contact with a tip end surface of an inner wall of a hub for attachment to an internal combustion engine. The first extending section 122 extends behind the contacting section 121 and has a smaller outer diameter than the contacting section 121. The second extending section 123 extends further behind than the first extending section 122 and has an even smaller outer diameter. The guide tube 11 is inserted and fitted inside the contacting section 121, the first extending section 122, and the second extending section 123.

In addition, one end of a protective tube 13 is welded and fixed to the outer periphery of the first extending section 122. The protective tube 13 protects the sheath pin 3, the guide tube 11, and a portion of an external lead 17.

The rib 12 is welded over the overall circumference to the guide tube 11 in the second extending section 123.

In addition, the cover 4 is welded over the overall circumference to the outer periphery of a tip end portion 301 of the sheath pin 3.

The guide tube 11, the sheath pin 3, and the cover 4 are composed of stainless steel or a Ni-based heat-resistant alloy. Furthermore, the rib 12 and the protective tube 13 are also composed of stainless steel or a Ni-based heat-resistant alloy.

In addition, the thickness of the guide tube 11 is greater than the thickness of an outer tube section 34 of the sheath pin 3. The guide tube 11 has a higher rigidity than the outer tube section 34 of the sheath pin 3.

The sheath pin 3 is composed of two lead wires 21, an insulating section 33, and the outer tube section 34, as shown in FIG. 2. The two lead wires 21 are composed of a Ni-based heat-resistant alloy. The insulating section 33 is composed of an insulating powder, such as magnesia, and disposed in the periphery of the lead wires 21. The outer tube section 34 is composed of stainless steel covering the outer periphery of the insulating section 33. The sheath pin 3 has a circular columnar shape. The outer pipe section 34 has a circular cylindrical shape. In addition, the lead wires 21 are exposed on the tip end side and the rear end side from the insulating section 21 and the outer tube section 34. The tips of the lead wires 21 are bonded to the electrode films 20 of the thermosensitive element 2 by the bonding material 22 (see FIG. 1). The rear ends of the lead wires 21 are bonded to the external lead wire 17 (see FIG. 2).

The protective layer 52 is in contact with the inner surface of the cover 4 at all times in a temperature range of room temperature to 850° C., as shown in FIG. 2 and FIG. 3. The protective layer 52 is in contact with the inner surface of the cover 4 at all times preferably in a temperature range of room temperature to 1000° C.

Furthermore, the protective layer 52 does not chemically react with the cover in the temperature range of room temperature to 850° C. The outer protective layer 52 does not chemically react with the cover 4 preferably in the temperature range of room temperature to 1000° C.

In addition, the lead wires 21 are bonded to the outer surfaces of the thermosensitive element 2, as shown in FIG. 1. In other words, the thermosensitive element 2 has a roughly rectangular parallelepiped shape. The pair of electrode films 20 are formed on a pair of surfaces that are parallel with each other. The lead wires 21 extending from within the sheath pin 3 are respectively directly bonded to the electrodes.

Next, an example of a method of manufacturing the temperature sensor 1 according to the present embodiment will be described.

First, the thermosensitive element 2 is manufactured as described below.

In other words, 52.2 vol % silicon nitride ($Si_3N_4$) powder (mean particle size of 0.7 µm), 40 vol % silicon carbide (SiC) powder (mean particle size of 0.2 µm), 5.5 vol % yttrium oxide ($Y_2O_3$) powder (mean particle size of 0.5 µm) as a sintering aid, and 2.3 vol % titanium boride ($TiB_2$) powder (mean particle size of 0.4 µm) as an additive were mixed. The mixture was mixed by a ball mill for 24 hours, using ethanol.

Next, the mixed raw material was placed within a mold. Uniaxial press-molding was performed at a pressure of 20 MPa. Hot pressing was performed for one hour in a $N_2$ atmosphere, under conditions of a temperature of 1850° C. and press pressure of 20 MPa. As a result, the thermosensitive element 2 was obtained that is composed of a sintered body (low-thermal expansion ceramics) having a rectangular parallelepiped shape (plate shape) with a length of 1 mm, a width of 1 mm, and a height of 0.5 mm.

Next, a Cr—Fe alloy paste was thick-film printed to a thickness of about 10 µm on the pair of surfaces opposing each other in the height direction of the thermosensitive element 2. The Cr—Fe alloy paste was then baked at a temperature 1300° C., thereby forming the electrode films 20. The Cr—Fe alloy paste has a granularity of about 30 µm or less.

Next, the lead wires 21 composed of a Ni-based alloy that extend from within the sheath pin 3 were bonded to the electrode films 20 of the thermosensitive element 2 in the following manner (see FIG. 1).

In other words, first, 80 wt % to 85 wt % NAS4425A5-type steel particles (mean particle size of 10 µm), 4 wt % to 6 wt % acrylic copolymer, 0.1 wt % to 1 wt % bis(methylhexyl) phthalate, 1 wt % to 2 wt % solvent naphtha, 5 wt % to 10 wt % butyl lactate, and 1 wt % or less silicon resin were mixed, thereby producing a paste-state bonding material.

Figure 4:
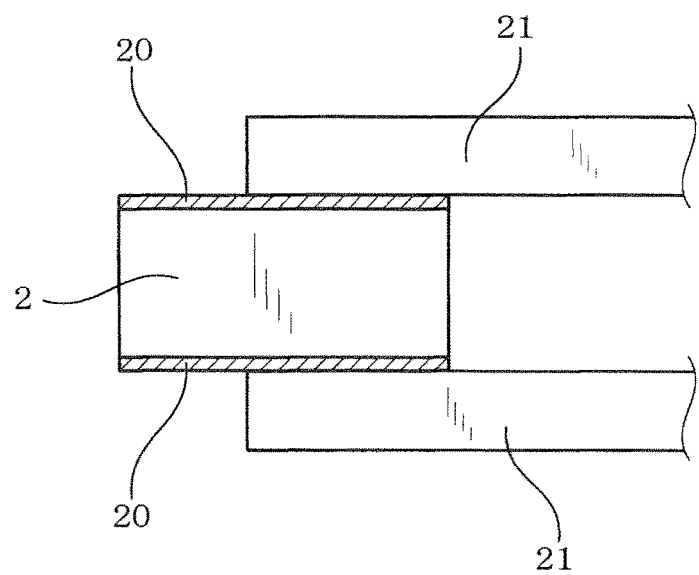
FIG. 4 is an explanatory diagram of a cross-sectional shape in a state in which lead wires are placed in contact with the thermosensitive element on which electrode films are formed.

Next, the lead wires 21 composed of a Ni-based alloy extending from the sheath pin were placed in contact with the pair of electrode surfaces 20 of the thermosensitive element 2, as shown in FIG. 4.

Figure 5:
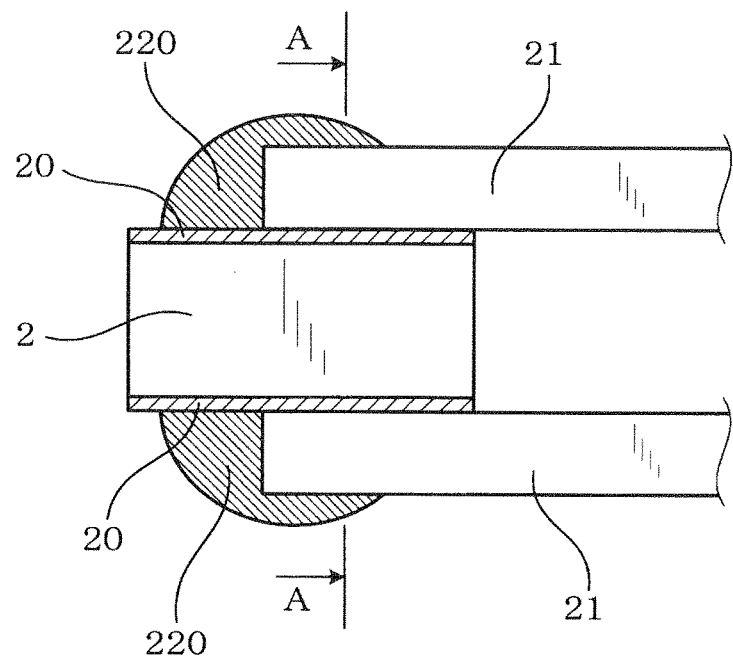
FIG. 5 is an explanatory diagram of a cross-sectional shape in a state in which a paste-state bonding material is applied to bonding sections between the electrode films of the thermosensitive element and the lead wires according to the first embodiment.
Figure 6:
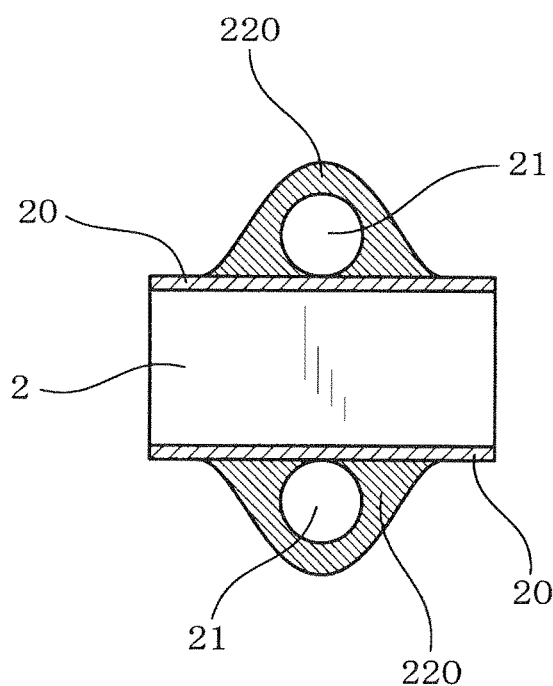
FIG. 6 is a cross-sectional view taken along line A-A in FIG. 5.

Then, a paste-state bonding material 220 was applied to the contacting sections of the electrode surfaces 20 and the lead wires by a paste-potting method, as shown in FIG. 5 and FIG. 6. The resultant was subsequently heated for one hour at a temperature of 1200° C. and baked. As a result, the electrode surfaces 20 of the thermosensitive element 2 and the lead wires 21 were bonded by the bonding material 22, as shown in FIG. 1.

Next, for example, a crystallized glass powder composed of 30 wt % to 60 wt % $SiO_2$, 10 wt % to 30 wt % CaO, 5 wt % to 25 wt % Mg, and 0 wt % to 15 wt % $Al_2O_3$ was mixed with a solvent and formed into a paste. The thermosensitive element 2 to which the lead wires 21 are bonded was dipped into the paste and a predetermined amount of glass paste was deposited. After drying, the resultant was heat-treated at 1200° C., thereby simultaneously performing crystallization of glass and baking. The protective layer 52 was formed as shown in FIG. 1. The coefficient of linear expansion of the glass paste is matched to that of the electrode film 20.

Next, the thermosensitive element 2 bonded to the lead wires 21 extending from the sheath pin and covered by the protective layer 52, as shown in FIG. 2 and FIG. 3, was inserted into the cover 4. The cover 4 has been heated to a temperature of 300° C. or higher. Next, the cover 4 was cooled to room temperature and welded to the side surface of the sheath pin 3.

The temperature sensor 1 was obtained as described above. Next, operational effects according to the present embodiment will be described. First, the temperature sensor 1 according to the present embodiment includes the thermosensitive element 2 composed of low-thermal expansion ceramics, as shown in FIG. 1. In the temperature sensor 1, the electrode films 20 composed of a Cr—Fe alloy and the lead wires 21 composed of a Ni-based alloy are bonded by the bonding material 22 formed by baking a paste-state Fe—Cr—Al alloy.

As a result of the materials in the periphery of the bonding sections of the lead wires 21 and the electrode films 20 being specified in this way, the coefficients of linear expansion of the thermosensitive element 2, the electrode films 20, the bonding material 22, and the lead wires 21 can be made closer to one other. Furthermore, when the coefficient of linear expansion of the low-thermal expansion ceramics composing the thermosensitive element 2 is $T_a$(/° C.), the coefficient of linear expansion of the electrode film 20 is $T_b$(/° C.), the coefficient of linear expansion of the bonding material 22 is $T_c$(/° C.), and the coefficient of linear expansion of the lead wire 21 is $T_d$(/° C.), $T_a \leq T_b \leq T_c \leq T_d$ can be established. The coefficients of linear expansion can be made closer to one another in steps.

In other words, a gradual gradient of the coefficient of linear expansion is formed between the thermosensitive element 2 composed of a low-thermal expansion ceramics and the lead wires 21, via the electrode films 20 and the bonding material 22. Therefore, disconnection does not easily occur even in a high-temperature environment. The temperature sensor 1 is highly reliable. In addition, thermal stress can be reduced even in a wide-range usage environment. Reliability of the temperature sensor 1 can be improved.

In addition, in the temperature sensor according to the present embodiment, the lead wires 21 composed of a Ni-based alloy is used. Strength is higher compared to a conventional lead wire composed of Pt. Therefore, durability against vibrations is excellent and disconnection does not easily occur. Effects similar to that according to the present embodiment are confirmed to be achieved even when a Fe—Cr—Al alloy (such as "NCA1" manufactured by Nisshin Steel Co., Ltd.) that is a ferrite-type stainless steel is used in place of the Ni-based alloy.

In addition, in the temperature sensor 1 according to the present embodiment, a lead wire composed of a Ni-based alloy is used. Departure from use of noble metals can be achieved. Therefore, the temperature sensor 1 according to the present embodiment can be manufactured at a low cost.

In addition, according to the present embodiment, the low-thermal expansion ceramics configuring the thermosensitive element 2 is composed of the first phase and the semiconductive or conductive second-phase particles. The first phase is composed of insulating matrix particles composed of a non-oxide. The second-phase particles are discontinuously dispersed in a three-dimensional mesh shape in the first phase.

Therefore, a temperature sensor having favorable sensitivity can be actualized. In addition, a temperature sensor capable of preventing reduction degradation and having superior heat-resistance can be actualized.

In addition, the temperature sensor 1 according to the present embodiment has the protective layer 52 that seals the thermosensitive element 2, the electrode films 20, and the bonding material 22 together with a portion of the lead wires 21.

Therefore, thermal stress in the bonding sections of the thermosensitive element 2, the electrode films 20, and the lead wires 21 can be reduced. In addition, holding strength of the bonding sections can be improved and durability against vibrations can be further improved.

As described above, according to the present embodiment, in the temperature sensor including the thermosensitive element having low-thermal expansion, disconnection can be prevented. In addition, a temperature sensor that can be manufactured at a low cost can be provided.

Second Embodiment

A temperature sensor according to a second embodiment of the present invention will be described. According to the second and subsequent embodiments, constituent elements that are the same as or equivalent to the constituent elements of the temperature sensor according to the first embodiment, described above, are given the same reference numbers. Descriptions thereof are omitted or simplified.

According to the present embodiment, an example is given of an instance in which the temperature sensor is manufactured by changing the method of forming the electrode films on the thermosensitive film and the like from that according to the first embodiment. Other than the changes in the method of forming the electrode film and the like, described hereafter, the temperature sensor according to the present embodiment has a similar configuration to that according to the first embodiment.

Regarding manufacturing of the temperature sensor according to the present embodiment, specifically, first, the thermosensitive element was obtained in a manner similar to that according to the first embodiment.

Next, a Cr—Fe alloy paste was thick-film printed to a thickness of about 10 μm to 20 μm on the pair of surfaces opposing each other in the height direction of the thermosensitive element. The Cr—Fe alloy paste was then baked at a temperature 1200° C., thereby forming the electrode films. The Cr—Fe alloy paste has a granularity of about 10 μm or less.

Next, the lead wires composed of a Ni-based alloy extending from within the sheath pin were bonded to the electrode films of the thermosensitive element in a manner similar to that according to the first embodiment.

In other words, first, 80 wt % to 85 wt % NAS4425A5-type steel particles (manufactured by Nippon Yakin Kogyo Co., Ltd.; mean particle size of 10 μm or less) equivalent to SUH21, 4 wt % to 6 wt % acrylic copolymer, 0.1 wt % to 1 wt % bis(methylhexyl) phthalate, 1 wt % to 2 wt % solvent naphtha, 5 wt % to 10 wt % butyl lactate, and 1 wt % or less silicon resin were mixed, thereby producing a paste-state bonding material.

Next, the lead wires composed of a Ni-based alloy extending from the sheath pin were placed in contact with the pair of electrode films of the thermosensitive element. Then, the paste-state bonding material was applied to the contacting sections of the electrode films and the lead wires by a paste-potting method. The resultant was subsequently heated for one hour at a temperature of 1100° C. and baked. As a result, the electrode films of the thermosensitive element and the lead wires were bonded by the bonding material.

Next, in a manner similar to that according to the first embodiment, the thermosensitive element to which the lead wires are bonded was dipped. After drying, the thermosensitive element was heat-treated, thereby forming the protective layer.

Next, in a manner similar to that according to the first embodiment, the thermosensitive element bonded to the lead wires extending from the sheath pin and covered by the protective layer was inserted into the heated cover and cooled. The cover was then welded to the side surface of the sheath pin.

The temperature sensor according to the present embodiment was obtained as described above. In the temperature sensor manufactured according to the present embodiment as well, in a manner similar to that according to the first embodiment, when the coefficient of linear expansion of the low-thermal expansion ceramics composing the thermosensitive element is $T_a$(/° C.), the coefficient of linear expansion of the electrode film is $T_b$(/° C.), the coefficient of linear expansion of the bonding material is $T_c$(/° C.), and the coefficient of linear expansion of the lead wire is $T_d$(/° C.), $T_a \leq T_b \leq T_c \leq T_d$ can be established. The coefficients of linear expansion can be made closer to one another in steps. In other words, a gradual gradient of the coefficient of linear expansion is formed between the thermosensitive element composed of a low-thermal expansion ceramics and the lead wires, via the electrode films and the bonding material. Therefore, disconnection does not easily occur even in a high-temperature environment. The temperature sensor according to the present embodiment is highly reliable. In addition, thermal stress can be reduced even in a wide-range usage environment. Reliability of the temperature sensor according to the present embodiment can be improved.

The temperature sensor according to the present embodiment achieves other operational effects similar to those according to the first embodiment.

Third Embodiment

A temperature sensor according to a third embodiment of the present invention will be described with reference to FIG. 7. According to the present embodiment, the present invention is related to a temperature sensor configured such that lead wires bonded to electrode films of a thermosensitive element are bonded to signal wires extending from a sheath pin.

Figure 7:
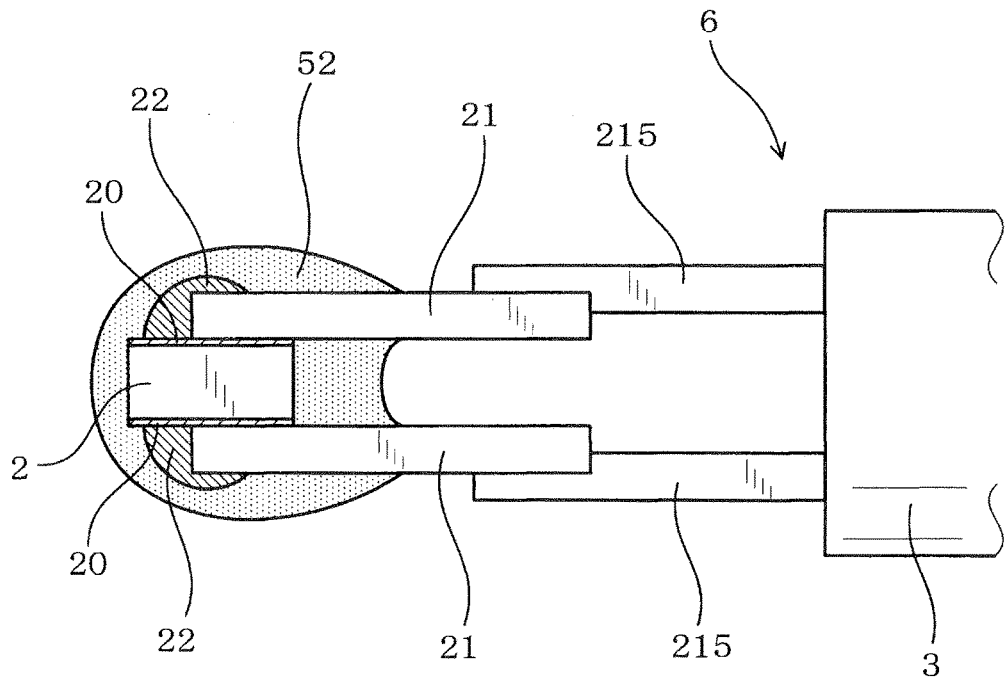
FIG. 7 is an explanatory diagram of a cross-section in the periphery of a thermosensitive element of a temperature sensor according to a third embodiment.

Specifically, in a temperature sensor 6 according to the present embodiment, in a manner similar to that according to the first embodiment, the rectangular parallelepiped thermosensitive element 2, the pair of electrode films 20, and the lead wires 21 are included, as shown in FIG. 7. The pair of electrode films 20 are provided on the surfaces of the thermosensitive element 2. The lead wires 21 are bonded to the pair of electrode films 20. The lead wires 21 are bonded to the electrode films 20 by the bonding material 22.

According to the present embodiment, the pair of lead wires 21 bonded to the electrode films 20 are bonded to signal wires 215 extending from the tip of the sheath pin 3. The lead wires 21 and the signal wires 215 can be bonded by laser welding. The rear ends of the signal wires 215 are bonded to an external lead wire in a manner similar to that according to the first embodiment (not shown).

According to the present embodiment, the lead wire 21 is composed of SUH21 (JIS G4312) composed of a Fe—Cr—Al alloy. The coefficient of linear expansion of the lead wire 21 is 11×10$^{-6}$/° C.

In addition, the signal wire 215 is composed of "INCONEL (registered trademark) 601" that is a Ni-based alloy (NCF601) manufactured by Daido-Special Metals Ltd. The coefficient of linear expansion of the signal wire 215 is 14×10$^{-6}$/° C.

Other configurations are similar to those according to the first embodiment. In the temperature sensor 6 according to the present embodiment as well, in a manner similar to that according to the first and second embodiments, when the coefficient of linear expansion of the low-thermal expansion ceramics composing the thermosensitive element 2 is $T_a$(/° C.), the coefficient of linear expansion of the electrode film 21 is $T_b$(/° C.), the coefficient of linear expansion of the bonding material 22 is $T_c$(/° C.), and the coefficient of linear expansion of the lead wire 21 is $T_d$(/° C.), $T_a \leq T_b \leq T_c \leq T_d$ can be established. The coefficients of linear expansion can be made closer to one another in steps (see FIG. 7). In other words, a gradual gradient of the coefficient of linear expansion is formed between the thermosensitive element 2 composed of a low-thermal expansion ceramics and the lead wires 21, via the electrode films 20 and the bonding material 22. Therefore, thermal stress can be reduced even in a wide-range usage environment. Reliability of the temperature sensor 6 according to the present embodiment can be improved.

The temperature sensor according to the present embodiment achieves other operational effects similar to those according to the first embodiment.

Fourth Embodiment

Figure 8:
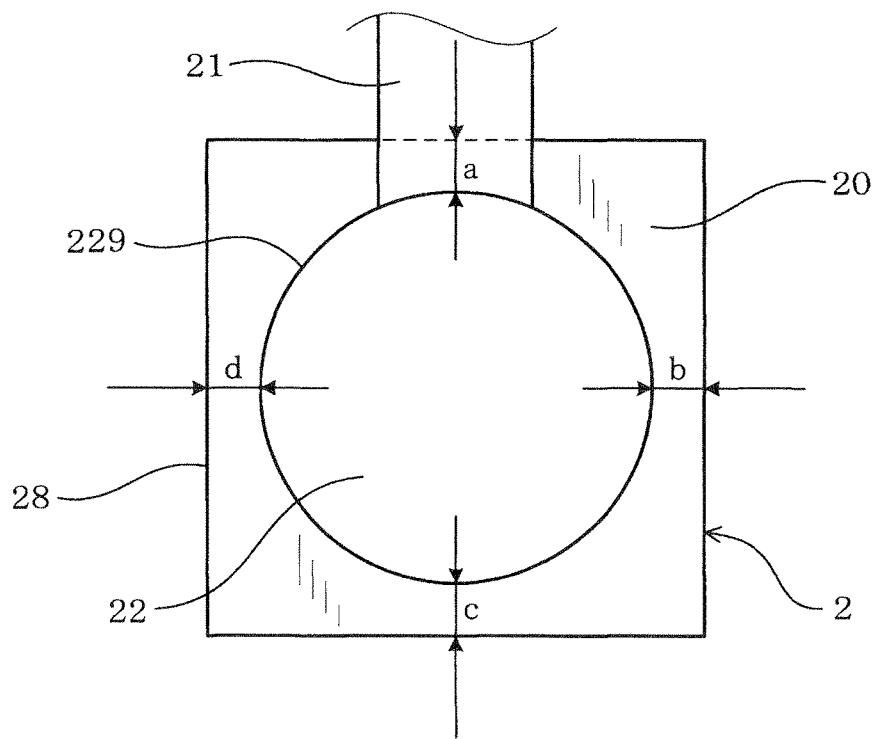
FIG. 8 is an explanatory diagram of a surface of a thermosensitive element in which lead wires and electrode films are bonded by a bonding material according to a fourth embodiment, showing a top view from the side on which the bond is formed.

A temperature sensor according to a third embodiment of the present invention will be described with reference to FIG. 8. According to the present embodiment, the present invention references a relationship between the shortest distance between an end portion of a thermosensitive element and an outer edge of a bonding material and the occurrence of cracks, on a bonding surface of the thermosensitive element and the bonding material. In other words, a plurality of temperature sensors (sample X1 to sample X5) having bonding materials in differing sized formed in the contacting sections between the electrode surfaces and the lead wires were manufactured. The presence of cracks occurring in the thermosensitive element after bonding material formation was checked.

Specifically, first, in a manner similar to that according to the first embodiment, the thermosensitive element was manufactured. A Cr—Fe alloy paste was thick-film printed to a thickness of about 10 μm to 20 μm on the pair of surfaces opposing each other in the height direction of the thermosensitive element. The Cr—Fe alloy paste was then baked at a temperature 1200° C., thereby forming the electrode films. The Cr—Fe alloy paste has a granularity of about 10 μm or less.

Next, 80 wt % to 85 wt % NAS4425A5-type steel particles (manufactured by Nippon Yakin Kogyo Co., Ltd.; mean particle size of 10 μm or less) equivalent to SUH21, 4 wt % to 6 wt % acrylic copolymer, 0.1 wt % to 1 wt % bis(methylhexyl) phthalate, 1 wt % to 2 wt % solvent naphtha, 5 wt % to 10 wt % butyl lactate, and 1 wt % or less silicon resin were mixed, thereby producing a paste-state bonding material.

Next, in a manner similar to that according to the first embodiment, the lead wires composed of a Ni-based alloy were placed in contact with the pair of electrode films formed on the thermosensitive element. Then, the paste-state bonding material was applied to the contacting sections of the electrode films and the lead wires by a paste-potting method. The resultant was subsequently heated for one hour at a temperature of 1100° C. and baked. As a result, the electrode films 20 of the thermosensitive element 2 and the lead wires 21 were bonded by the bonding material 22 (see FIG. 8).

According to the present embodiment, bonding materials of differing sizes are formed by the bonding area on the electrode film being changed by changing the amount of paste-state bonding material applied.

In other respects, the temperature sensor can be manufactured in a manner similar to that according to the first embodiment. According to the present embodiment, on the bonding surface of the thermosensitive element 2 and the bonding material 22, the shortest distance (a, b, c, or d) between an end portion 28 of the thermosensitive element 2 and an outer edge 229 of the bonding material 22 was measured. As shown in FIG. 8, according to the present embodiment, in a top view, from the side on which the bond is formed, of the surface of the rectangular parallelepiped thermosensitive element 2 on which the bonding material 22 is formed, the bonding material 22 is formed such that the outer edge 229 is roughly circular. Therefore, the above-described shortest distance is distance a, distance b, distance c, or distance d, shown in FIG. 8.

According to the present embodiment, in the manufactured samples X1 to X5 of the temperature sensor, distance a, distance b, distance c, or distance d was measured, and the shortest distance was checked. The results are shown in Table 1.

In addition, regarding each sample, after the bonding material was formed, the presence of cracks that may occur in the thermosensitive element was checked under a microscope. The presence of cracks was checked for each of the five manufactured temperature sensors under similar conditions as that of each sample X1 to X5 (N=5). The results are shown in Table 1. In Table 1, "×" indicates when cracks can be observed and "○" indicates when cracks are not observed.

TABLE 1

| SAMPLE NO. | THE SHORTEST DISTANCE BETWEEN THE END PORTION OF THE THERMOSENSITIVE ELEMENT AND THE BONDING MATERIAL ON THE BONDING SURFACE (mm) | EXISTENCE OF CRACK | | | | |
|---|---|---|---|---|---|---|
| | | THE FIRST TEST | THE SECOND TEST | THE THIRD TEST | THE FOURTH TEST | THE FIFTH TEST |
| X1 | 0 | x | x | x | x | x |
| X2 | 0.05 | x | x | x | x | ○ |
| X3 | 0.10 | ○ | ○ | ○ | ○ | ○ |
| X4 | 0.15 | ○ | ○ | ○ | ○ | ○ |
| X5 | 0.20 | ○ | ○ | ○ | ○ | ○ |

As Table 1 clearly indicates, on the bonding surface of the thermosensitive element 2 and the bonding material 22, when the shortest distance between the end portion 28 of the thermosensitive element 2 and the bonding material 22 is at least 0.1 mm or more (samples X3 to X5), no cracks occurred in the five measurements. On the other hand, when the shortest distance between the end portion 28 of the thermosensitive element 2 and the bonding material 22 is less than 0.1 mm (samples X1 and X2), the occurrence of cracks in the thermosensitive element after formation of the bonding material was observed in at least any of the five measurements.

In this way, according to the present embodiment, it is clear that the shortest distance between the end portion 28 of the thermosensitive element 2 and the bonding material on the bonding surface of the thermosensitive element 2 and the bonding material 22 is preferably at least 0.1 mm or more.

Fifth Embodiment

A temperature sensor according to a third embodiment of the present invention will be described with reference to FIG. 9. According to the present embodiment, an example is given in which a temperature sensor is manufactured by electrode films and lead wires being bonded without use of a bonding material.

Figure 9:
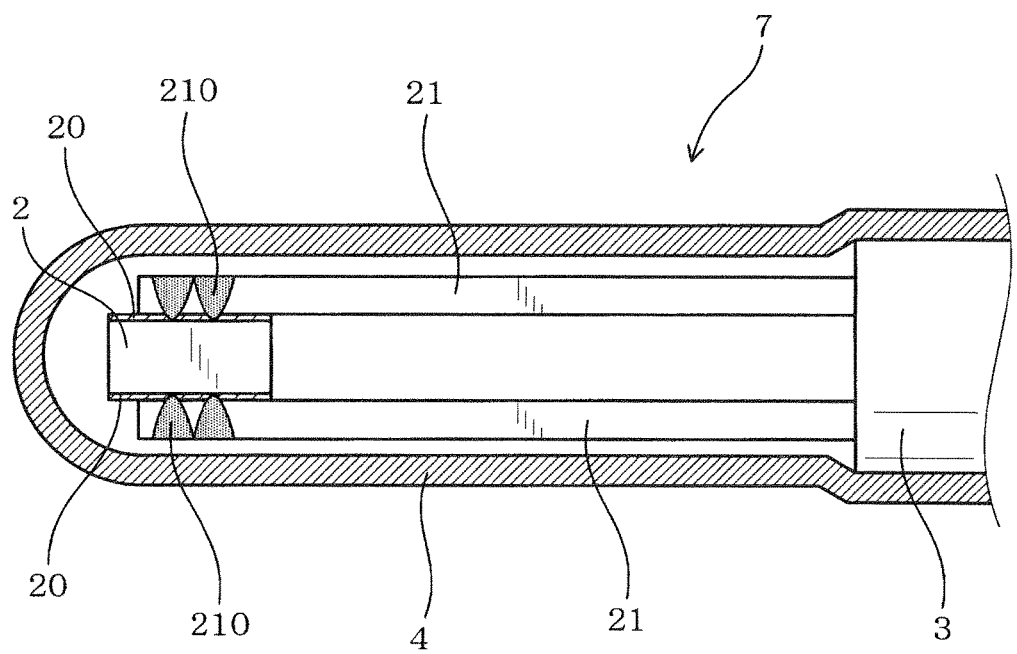
FIG. 9 is an explanatory diagram of a cross-section of a tip portion of a temperature sensor according to a fifth embodiment.

Specifically, the electrode films 20 and the lead wires 21 are bonded by laser welding, as shown in FIG. 9. In addition, according to the present embodiment, a temperature sensor 7 is formed without formation of a protective layer. Other than the electrode films 20 and the lead wires 21 being bonded by laser welding without use of a bonding material and the protective layer not being formed, the temperature sensor 7 according to the present embodiment has a configuration similar to that according to the first embodiment.

To manufacture the temperature sensor 7 according to the present embodiment, specifically, first, the thermosensitive element 2 was manufactured in a manner similar to that according to the first embodiment, as shown in FIG. 9. Next, a Cr—Fe alloy paste was thick-film printed to a thickness of about 10 µm to 20 µm on the pair of surfaces opposing each other in the height direction of the thermosensitive element 2. The Cr—Fe alloy paste was then baked at a temperature 1200° C., thereby forming the electrode films 20. The Cr—Fe alloy paste has a granularity of about 10 µm or less.

Next, the lead wires 21 composed of a Ni-based alloy extending from within the sheath pin 3 were bonded to the electrode films 20 of the thermosensitive element 2. The electrode films 20 and the lead wires 21 were bonded in the bonding section by laser welding. Although the electrode films 20 and the lead wires 21 are bonded by laser welding according to the present embodiment, they can also be bonded by, for example resistance welding.

Next, in a manner similar to that according to the first embodiment, the thermosensitive element 2 bonded to the lead wires 21 extending from the sheath pin 3 was inserted into the heated cover 4 and cooled. The cover was then welded to the side surface of the sheath pin.

The temperature sensor 7 according to the present embodiment was obtained as described above. In the temperature sensor 7 manufactured according to the present embodiment, when the coefficient of linear expansion of the low-thermal expansion ceramics composing the thermosensitive element 2 is $T_a$(/° C.), the coefficient of linear expansion of the electrode film 20 is $T_b$(/° C.), and the coefficient of linear expansion of the lead wire is $T_d$(/° C.), $T_a \leq T_b \leq T_d$ can be established. The coefficients of linear expansion can be made closer to one another in steps. In other words, a gradual gradient of the coefficient of linear expansion is formed between the thermosensitive element 2 composed of a low-thermal expansion ceramics and the lead wires 21, via the electrode films 20. Therefore, thermal stress can be reduced even in a wide-range usage environment. Reliability of the temperature sensor 7 according to the present embodiment can be improved.

In addition, in the temperature sensor 7 according to the present embodiment, the lead wires 21 and the electrode films 20 are bonded by laser welding without use of a bonding material, as shown in FIG. 9. Welding sections 210 are formed in the bonding sections of the lead wires 21 and the electrode films 20. The welding sections 210 are formed by the lead wires 21 and the electrode films 20 partially melting and then hardening by laser welding.

Therefore, strength of the bonding section can be increased compared to that of so-called diffusion bonding using a bonding material. In addition, heat treatment by a vacuum furnace or the like is required for bonding using a bonding material. However, when bonding is performed by welding as according to the present embodiment, heat treatment is not required to be performed during bonding. Therefore, productivity increases. In addition, occurrence of residual thermal strain can be prevented. Therefore, thermal-stress resistance can be improved.

The temperature sensor according to the present embodiment achieves other operational effects similar to those according to the first embodiment.

According to the present embodiment, the temperature sensor is manufactured without formation of the protective layer. However, in a manner similar to that according to the first embodiment, the protective layer can be formed by the thermosensitive element to which the lead wires are connected being dipped, dried, and heat-treated.

REFERENCE SIGNS LIST

1: temperature sensor
2: thermosensitive element
20: electrode film
21: lead wire
22: bonding material

What is claimed is:

1. A temperature sensor comprising:
 a thermosensitive element composed of a low-thermal expansion ceramics having a coefficient of linear expansion of $3 \times 10^{-6}$/° C. to $5 \times 10^{-6}$/° C. and of which electrical characteristics change depending on temperature;
 a pair of electrode films provided on the surfaces of the thermosensitive element, wherein the electrode films are composed of an alloy containing at least Cr and Fe of which a main component is Cr; and
 a pair of lead wires having a coefficient of linear expansion of $15 \times 10^{-6}$/° C. or less and bonded to the electrode films,
 wherein, when coefficients of linear expansion of the thermosensitive element, the electrode films, and the lead wires are denoted by Ta(/° C.), Tb(/° C.), and Td(/° C.) respectively, the coefficients of the linear expansion of the thermosensitive element, the electrode films, and the lead wires are set to satisfy a relationship of Ta≤Tb≤Td and
 the coefficient of the linear expansion of the electrode films, Tb(/° C.), is $11 \times 10^{-6}$/° C. or less.

2. The temperature sensor according to claim 1, comprising a protective layer that seals the thermosensitive element and the electrode films together with a portion of the lead wire.

3. The temperature sensor according to claim 1, the Cr—Fe is an alloy containing 60 wt % to 90 wt % Cr and 40 wt % to 10 wt % Fe.

4. The temperature sensor according to claim 1, wherein the thermosensitive element includes a matrix phase composed of matrix particles composed of silicon nitride.

5. The temperature sensor according to claim 4, comprising a protective layer that seals the thermosensitive element and the electrode films together with a portion of the lead wire.

6. The temperature sensor according to claim 1, wherein the bonding material, the electrode films and the lead wires are composed of an alloy containing at least Cr and Fe.

7. The temperature sensor according to claim 6, wherein the electrode film is formed on overall surfaces of a pair of opposing surfaces of the thermosensitive element and, on a bonding surface bonding both the thermosensitive element and the bonding material, a shortest distance between an end portion of the thermosensitive element and the bonding material is at least 0.1 mm or more.

8. The temperature sensor according to claim 7, wherein the thermosensitive element includes a matrix phase composed of matrix particles composed of silicon nitride.

9. The temperature sensor according to claim 8, comprising a protective layer that seals the thermosensitive element and the electrode films together with a portion of the lead wire.

10. The temperature sensor according to claim 1, wherein
 the electrode films and the lead wires are mutually bonded via a bonding material composed of metal,
 when a coefficient of linear expansion of the bonding material is denoted by Tc(/° C.), the coefficients of the liner expansion of the thermosensitive element, the electrode film, the lead wire, and the bonding material are set to satisfy a relationship of Ta≤Tb≤Tc≤Td, and
 the coefficient of the linear expansion of the bonding material, Tc (/° C.), is set to be Tc≤$12 \times 10^{-6}$.

11. The temperature sensor according to claim 10, wherein the electrode film is formed on overall surfaces of a pair of opposing surfaces of the thermosensitive element and, on a bonding surface bonding both the thermosensitive element and the bonding material, a shortest distance between an end portion of the thermosensitive element and the bonding material is at least 0.1 mm or more.

12. The temperature sensor according to claim 11, wherein the thermosensitive element includes a matrix phase composed of matrix particles composed of silicon nitride.

13. The temperature sensor according to claim 12, comprising a protective layer that seals the thermosensitive element and the electrode films together with a portion of the lead wire.

14. The temperature sensor according to claim 10, wherein the bonding material and the lead wires are composed of an alloy containing at least Cr and Fe.

15. The temperature sensor according to claim 14, wherein the electrode films are formed on overall surfaces of a pair of opposing surfaces of the thermosensitive element and, on a bonding surface bonding both the thermosensitive element and the bonding material, a shortest distance between an end portion of the thermosensitive element and the bonding material is at least 0.1 mm or more.

16. The temperature sensor according to claim 15, wherein the thermosensitive element includes a matrix phase composed of matrix particles composed of silicon nitride.

17. The temperature sensor according to claim 16, comprising a protective layer that seals the thermosensitive element and the electrode films together with a portion of the lead wire.

\* \* \* \* \*